(12) United States Patent
Yamada et al.

(10) Patent No.: US 10,915,228 B2
(45) Date of Patent: Feb. 9, 2021

(54) CHARACTER INPUT DEVICE, CHARACTER INPUT METHOD, AND CHARACTER INPUT PROGRAM

(71) Applicant: OMRON Corporation, Kyoto (JP)

(72) Inventors: Takahiro Yamada, Kyoto (JP); Yasumasa Sasano, Kyoto (JP)

(73) Assignee: OMRON Corporation, Kyoto (JP)

( * ) Notice: Subject to any disclaimer, the term of this patent is extended or adjusted under 35 U.S.C. 154(b) by 0 days.

(21) Appl. No.: 16/792,923

(22) Filed: Feb. 18, 2020

(65) Prior Publication Data
US 2020/0293158 A1   Sep. 17, 2020

(30) Foreign Application Priority Data

Mar. 14, 2019  (JP) ................. 2019-046953

(51) Int. Cl.
*G06F 3/048* (2013.01)
*G06F 3/0482* (2013.01)
*G06F 3/0484* (2013.01)

(52) U.S. Cl.
CPC ........ *G06F 3/0482* (2013.01); *G06F 3/04845* (2013.01)

(58) Field of Classification Search
CPC .......................... G06F 3/0482; G06F 3/04845
See application file for complete search history.

(56) References Cited

U.S. PATENT DOCUMENTS

| 2013/0305178 | A1 | 11/2013 | Matsuzawa et al. |
| 2014/0201681 | A1* | 7/2014 | Mahaffey ............ H04M 1/72569 715/846 |
| 2014/0237356 | A1 | 8/2014 | Durga et al. |
| 2017/0052703 | A1* | 2/2017 | Bi ........................ G06F 3/04897 |
| 2017/0091343 | A1* | 3/2017 | Shorina ................. G06F 16/242 |
| 2018/0157767 | A1* | 6/2018 | Balyan .............. G06F 16/90328 |

FOREIGN PATENT DOCUMENTS

| EP | 2312459 A1 | 4/2011 |
| JP | 2015-185144 A | 10/2015 |

OTHER PUBLICATIONS

The Communication dated Jul. 30, 2020 in the counterpart European patent application.

* cited by examiner

*Primary Examiner* — David E Choi
(74) *Attorney, Agent, or Firm* — Metrolex IP Law Group, PLLC

(57) ABSTRACT

A character input device includes a character input unit that receives an input character, a suggestion list management unit that converts the input character, a suggestion list generator that generates a conversion suggestion list through conversion of the input character, a suggestion display including a standard-suggestion display area for displaying the conversion suggestion list, an operation detector that detects movement of a divisional suggestion included in the conversion suggestion list, and a suggestion division management unit that generates a divisional-suggestion display area different from the standard-suggestion display area in the suggestion display in response to the movement of the divisional suggestion. The suggestion division management unit associates the divisional suggestion with the divisional-suggestion display area, and outputs the divisional suggestion to the divisional-suggestion display area.

13 Claims, 13 Drawing Sheets

CHARACTER INPUT DEVICE, CHARACTER INPUT METHOD, AND CHARACTER INPUT PROGRAM

CROSS-REFERENCE TO RELATED APPLICATION

This application claims priority to Japanese Patent Application No. 2019-046953 filed on Mar. 14, 2019, the contents of which are incorporated herein by reference.

FIELD

The disclosure relates to a technique for inputting characters on a touchscreen input device.

BACKGROUND

A structure described in Patent Literature 1 displays conversion suggestions corresponding to input characters and outputs characters selected from the conversion suggestions.

CITATION LIST

Patent Literature

Patent Literature 1: Japanese Unexamined Patent Application Publication No. 2015-185144

SUMMARY

Technical Problem

However, the structure described in Patent Literature 1 displays the conversion suggestions in a one-dimensional list arranged in the order of priority calculated in accordance with a predetermined rule. More specifically, the conversion suggestions appear one-dimensionally and thus in the order determined based on a single evaluation criterion. This structure cannot respond to a user who may intend to input characters from conversion suggestions based on multiple evaluation criteria.

One or more aspects are directed to a technique for outputting conversion suggestions based on multiple evaluation criteria and enabling highly usable character input.

Solution to Problem

A character input device includes a character input unit that receives an input character, a suggestion list management unit that converts the input character, a suggestion list generator that generates a conversion suggestion list through conversion of the input character, a suggestion display including a standard-suggestion display area for displaying the conversion suggestion list, an operation detector that detects movement of a divisional suggestion included in the conversion suggestion list, and a suggestion division management unit that generates a divisional-suggestion display area different from the standard-suggestion display area in the suggestion display in response to the movement of the divisional suggestion. The suggestion division management unit associates the divisional suggestion with the divisional-suggestion display area, and outputs the divisional suggestion to the divisional-suggestion display area.

This structure can divide the area for displaying the conversion suggestion list as intended by the user, and thus improves usability for the user.

The suggestion list management unit included in the character input device may output, when a suggestion relevant to the divisional suggestion is available, the relevant suggestion to the divisional-suggestion display area.

This structure can display the suggestions relevant to the divided conversion suggestion, and thus improves usability for the user further.

In response to the operation detector included in the character input device detecting the divisional suggestion moved from the divisional-suggestion display area, the suggestion division management unit may dissociate the divisional suggestion from the divisional-suggestion display area.

This structure can reset the divided conversion suggestion.

The character input device may further include a suggestion size adjuster that adjusts a size of the divisional-suggestion display area.

This structure allows customization of the size of the area for displaying the divided conversion suggestion.

The character input device may further include an area selection detector that counts a number of times the divisional-suggestion display area is selected. The suggestion size adjuster may adjust the size of the divisional-suggestion display area in accordance with the selection count.

This structure can adjust the size of the area for displaying the divided conversion suggestion in accordance with the selection count for the area for displaying the divided conversion suggestion, thus providing an environment reflecting the operating situation of the user.

The character input device may further include an effective suggestion number detector that computes a number of effective suggestions based on a suggestion relevant to the input character and a degree of relevance of the suggestion to the input character. The suggestion size adjuster may adjust the size of the divisional-suggestion display area in accordance with the number of effective suggestions.

This structure can adjust the size of the area for displaying the divided conversion suggestion in accordance with a suggestion relevant to the input character and the degree of relevance of the suggestion to the input character, thus providing an environment reflecting the operating situation of the user.

Advantageous Effects

One or more aspects allow output of conversion suggestions based on multiple evaluation criteria and enable highly usable character input.

DETAILED DESCRIPTION

Embodiments are now described with reference to the drawings.

Example Use

Figure 1:
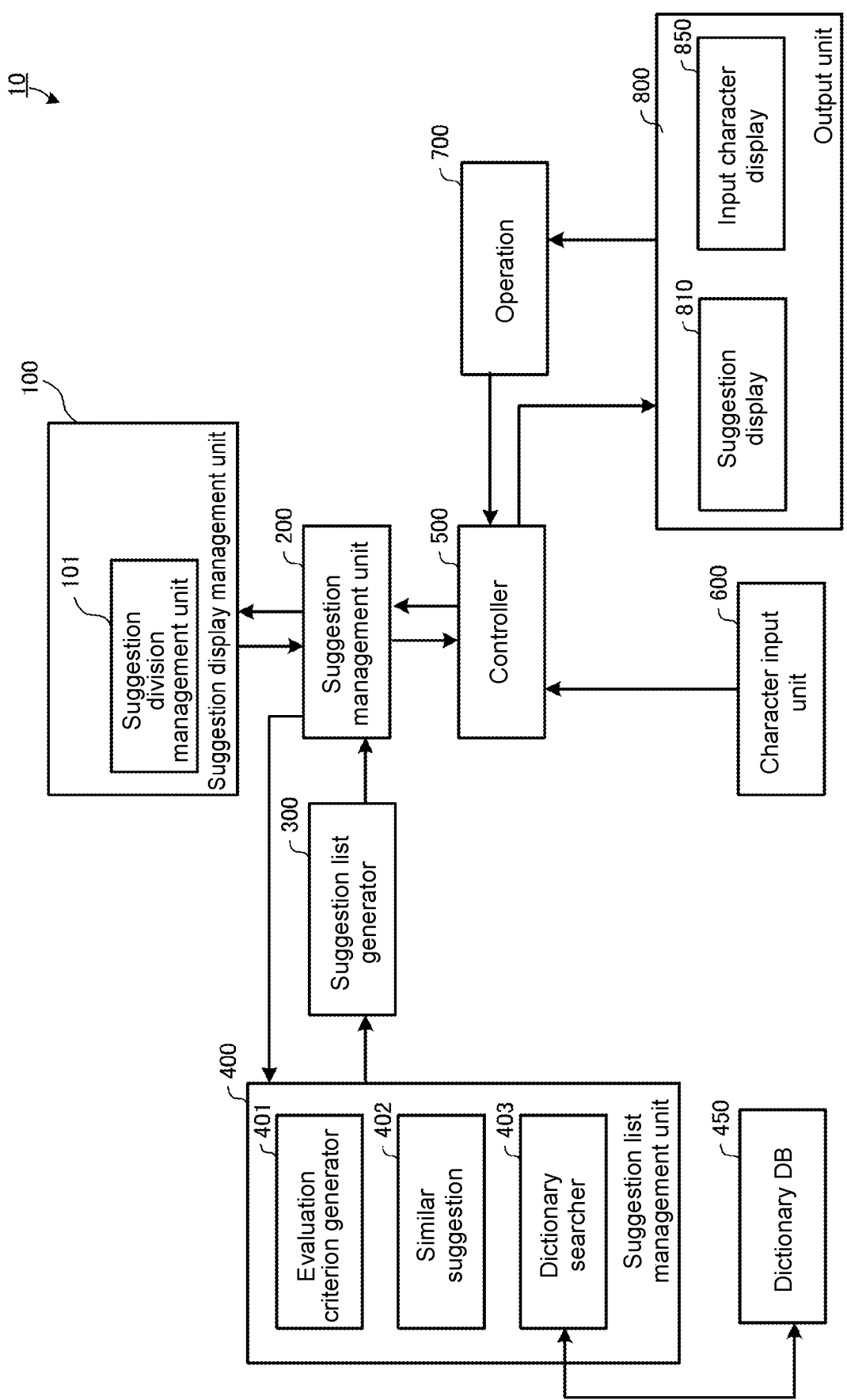
FIG. 1 is a block diagram illustrating a character input device according to a first embodiment.

An example use is described first with reference to FIG. 1. FIG. 1 is a block diagram of a character input device 10 according to a first embodiment. The character input device 10 is included in, for example, a mobile communication terminal such as a smartphone, and allows a user to input characters by performing an operation on a touchscreen display.

The character input device 10 includes a suggestion display management unit 100, a suggestion management unit 200, a suggestion list management unit 400, a dictionary database (DB) 450, a controller 500, a character input unit 600, an operation detector 700, and an output unit 800.

The suggestion display management unit 100 includes a suggestion division management unit 101. The suggestion list management unit 400 includes an evaluation criterion generator 401, a similar suggestion determination unit 402, and a dictionary searcher 403. The output unit 800 includes a suggestion display 810 and an input character display 850. The suggestion display 810 includes a standard-suggestion display area and a divisional-suggestion display area.

A character input operation is performed through the character input unit 600. More specifically, the character input unit 600 includes a software keyboard with a touchscreen display. Although Japanese characters are input in the example below, the technique described herein is also applicable to inputting alphabetical characters.

The character input unit 600 receives a character input from a user. For example, the user inputs Japanese hiragana characters li through the character input unit 600. The character input unit 600 outputs the character string li to the controller 500.

The controller 500 outputs the character string li to the suggestion management unit 200. The suggestion management unit 200 outputs the character string li to the suggestion list management unit 400.

The dictionary searcher 403 included in the suggestion list management unit 400 uses the character string li to search the dictionary DB 450 for conversion suggestions. The dictionary searcher 403 outputs, for example, a list of conversion suggestions including different sets of kanji (Chinese) characters (e.g., Kanji 1, Kanji 2, Kanji 3, or Kanji 4) for the character string li (hereafter, Kanji 1 and Kanji 3 are used for example). The dictionary searcher 403 outputs a list of conversion suggestions Kanji 1 and Kanji 3 to a suggestion list generator 300.

The suggestion list generator 300 outputs the list of conversion suggestions Kanji 1 and Kanji 3 to the suggestion management unit 200. The suggestion management unit 200 outputs the list of conversion suggestions Kanji 1 and Kanji 3 to the controller 500.

The controller 500 outputs the list of conversion suggestions Kanji 1 and Kanji 3 to the standard-suggestion display area in the suggestion display 810. The standard-suggestion display area is a default display area used for conversion of input characters. The standard-suggestion display area is a two-dimensional planar area.

The user selects Kanji 3 from the list of conversion suggestions Kanji 1 and Kanji 3 output to the standard-suggestion display area in the suggestion display 810. For the selection, the user moves the character string Kanji 3 out of the standard-suggestion display area in the suggestion display 810. More specifically, the user selects the character string Kanji 3 in the suggestion display 810 and drags the character string Kanji 3 out of the standard-suggestion display area in the suggestion display 810.

The operation detector 700 detects the movement of the character string Kanji 3. The operation detector 700 outputs information indicating the movement of the character string Kanji 3 to the controller 500. The controller 500 then outputs the information indicating the movement of the character string Kanji 3 to the suggestion management unit 200.

The suggestion management unit 200 first outputs the information indicating the movement of the character string Kanji 3 to the suggestion display management unit 100. The suggestion division management unit 101 in the suggestion display management unit 100 generates a divisional-suggestion display area different from the standard-suggestion display area. The suggestion division management unit 101 associates the character string Kanji 3 with the generated divisional-suggestion display area.

The divisional-suggestion display area different from the standard-suggestion display area is a two-dimensional planar area. The divisional-suggestion display area may appear at selected coordinates on the suggestion display 810 or at the position on the suggestion display 810 to which the character string is moved by the user.

The suggestion management unit 200 then searches for any character string relevant to the character string Kanji 3. The suggestion management unit 200 outputs the character string Kanji 3 to the suggestion list generator 300. The suggestion list generator 300 outputs the character string Kanji 3 to the suggestion list management unit 400.

The similar suggestion determination unit 402 performs determination about the character string Kanji 3, or determines that the character string Kanji 3 is relevant to a person's name (family name). The evaluation criterion generator 401 then generates an evaluation criterion to be a person's name. The similar suggestion determination unit 402 instructs the dictionary searcher 403 to search the dictionary DB 450 using the character string Kanji 3 and the evaluation criterion for a person's name as search conditions.

The dictionary searcher 403 searches the dictionary DB 450 based on the character string Kanji 3 and the evaluation criterion for a person's name. The dictionary searcher 403 outputs relevant suggestions Kanji 5 and Kanji 4 to the suggestion list generator 300 as a search result.

The dictionary DB 450 has categories corresponding to evaluation criteria. More specifically, the evaluation criterion generator 401 generates categories in accordance with the evaluation criteria registered with the dictionary DB 450. This allows the dictionary searcher 403 to easily perform a search using the character string Kanji 3 and the evaluation criterion for a person's name.

The suggestion list generator 300 outputs a list of relevant suggestions Kanji 5 and Kanji 4 to the suggestion management unit 200. The suggestion management unit 200 outputs the character string Kanji 3, information indicating a divisional-suggestion display area, and the relevant suggestions Kanji 5 and Kanji 4 to the controller 500.

The controller 500 generates the divisional-suggestion display area in the suggestion display 810. The controller 500 further outputs the character string Kanji 3 and the relevant suggestions Kanji 5 and Kanji 4 to the divisional-suggestion display area.

The above structure can divide the area for displaying conversion suggestions as intended by the user, and can further display any character string relevant to the character string selected by the user. This enables highly usable character input.

Example Structure 1

Figure 2A:
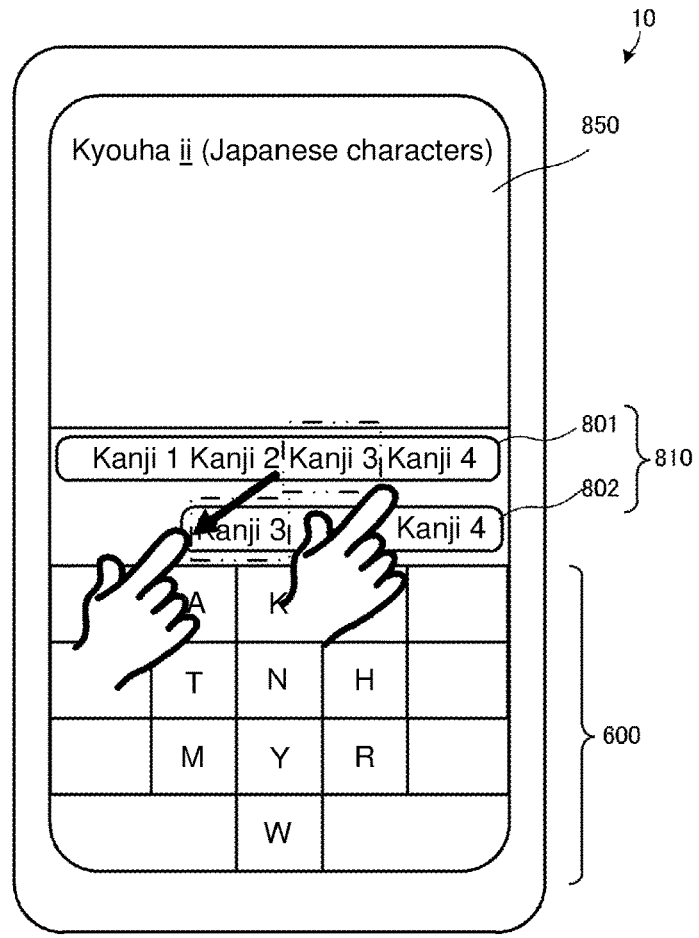
FIGS. 2A and 2B are schematic diagrams illustrating a character input device according to a first embodiment.
Figure 2B:
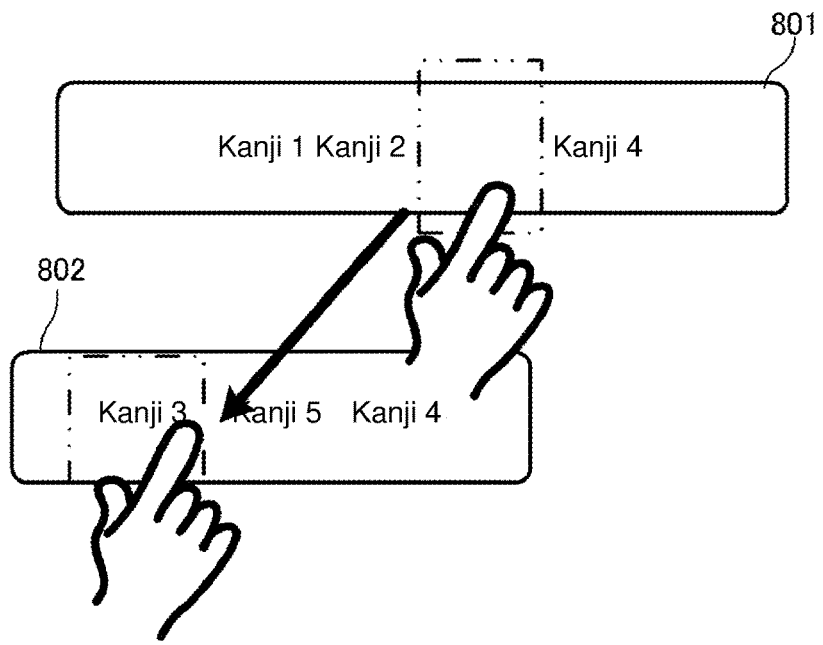
Figure 3:
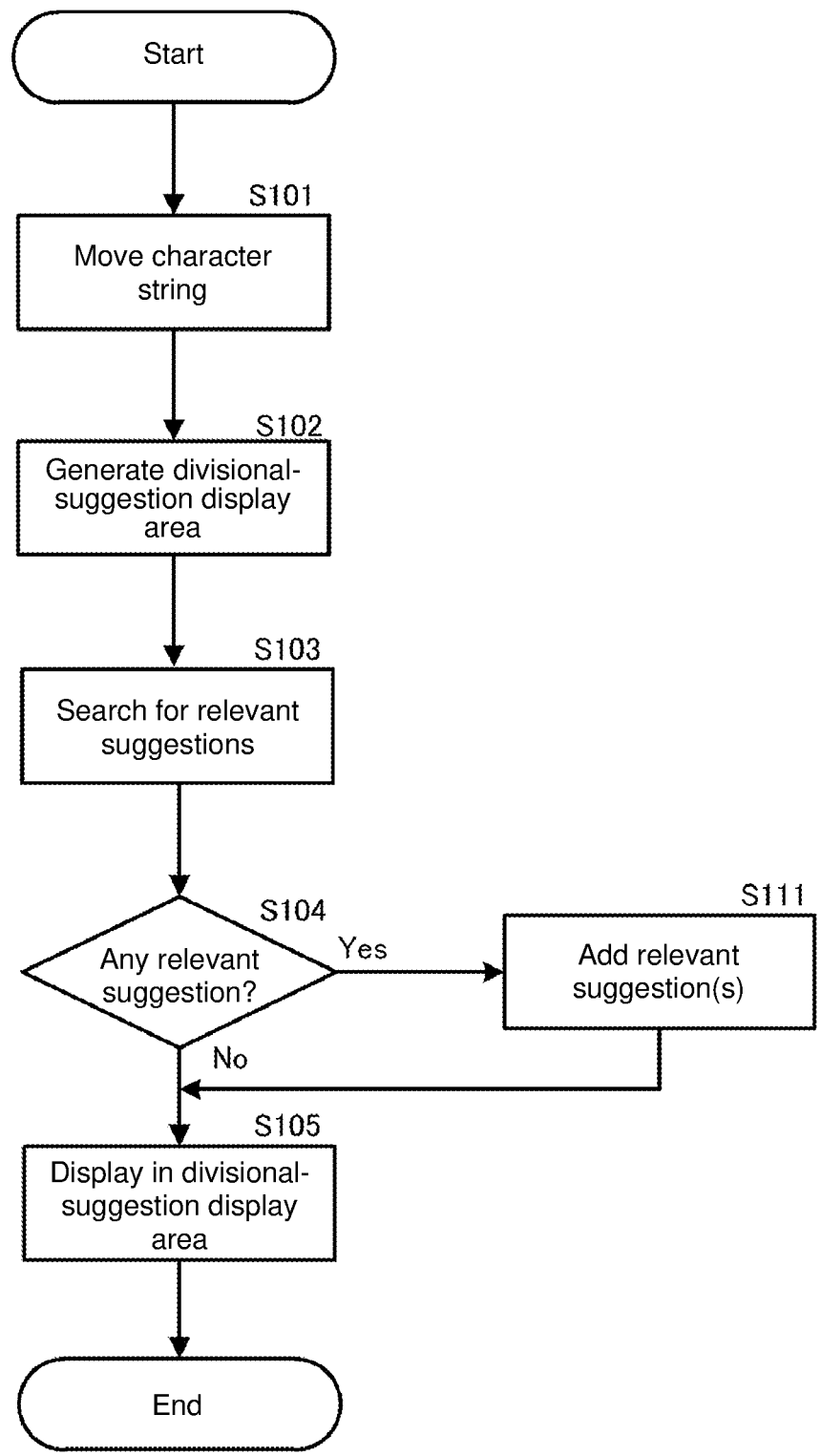
FIG. 3 is a flow diagram illustrating an operation of a character input device according to a first embodiment.

FIG. 1 is a block diagram of a character input device 10 according to a first embodiment. FIGS. 2A and 2B are schematic diagrams of the character input device 10 according to a first embodiment. FIG. 3 is a flowchart showing an operation of the character input device 10 according to a first embodiment.

An example structure will be described in more detail with reference to FIGS. 2A and 2B based on the structure of the character input device 10 shown in FIG. 1. FIG. 2B is a partially enlarged view of the character input device 10 in FIG. 2A.

As shown in FIGS. 1 and 2A, the character input device 10 includes the character input unit 600, the suggestion display 810, and the input character display 850. The suggestion display 810 includes a standard-suggestion display area 801 and a divisional-suggestion display area 802.

As shown in FIG. 2A, the user inputs characters li. The character input unit 600 outputs the character string li to the controller 500.

The controller 500 outputs the character string li to the suggestion management unit 200. The suggestion management unit 200 outputs the character string li to the suggestion list management unit 400.

The dictionary searcher 403 included in the suggestion list management unit 400 uses the character string li to search the dictionary DB 450 for conversion suggestions. The dictionary searcher 403 outputs, for example, a list of conversion suggestions Kanji 1, Kanji 2, Kanji 3, and Kanji 4. The dictionary searcher 403 outputs the list of conversion suggestions Kanji 1, Kanji 2, Kanji 3, and Kanji 4 to the suggestion list generator 300.

The suggestion list generator 300 outputs the list of conversion suggestions Kanji 1, Kanji 2, Kanji 3, and Kanji 4 to the suggestion management unit 200. The suggestion management unit 200 outputs the list of conversion suggestions Kanji 1, Kanji 2, Kanji 3, and Kanji 4 to the controller 500.

The controller 500 outputs the list of conversion suggestions Kanji 1, Kanji 2, Kanji 3, and Kanji 4 to the standard-suggestion display area 801.

The user selects the character string Kanji 3 from the list of conversion suggestions Kanji 1, Kanji 2, Kanji 3, and Kanji 4 output to the standard-suggestion display area 801. For the selection, the user moves the character string Kanji 3 out of the standard-suggestion display area 801.

The operation detector 700 detects the movement of the character string Kanji 3. The operation detector 700 outputs information indicating the movement of the character string Kanji 3 to the controller 500. The controller 500 then outputs the information indicating the movement of the character string Kanji 3 to the suggestion management unit 200.

The suggestion management unit 200 first outputs the information indicating the movement of the character string Kanji 3 to the suggestion display management unit 100. The suggestion division management unit 101 included in the suggestion display management unit 100 generates the divisional-suggestion display area 802. The suggestion division management unit 101 associates the character string Kanji 3 with the divisional-suggestion display area 802.

The suggestion management unit 200 then searches for any character string relevant to the character string Kanji 3. The suggestion management unit 200 outputs the character string Kanji 3 to the suggestion list generator 300. The suggestion list generator 300 outputs the character string Kanji 3 to the suggestion list management unit 400.

The similar suggestion determination unit 402 performs determination about the character string Kanji 3, or determines that the character string Kanji 3 is relevant to a person's name (family name).

The evaluation criterion generator 401 then generates an evaluation criterion to be a person's name. The similar suggestion determination unit 402 instructs the dictionary searcher 403 to search the dictionary DB 450 using the character string Kanji 3 and the evaluation criterion for a person's name as search conditions.

The dictionary searcher 403 searches the dictionary DB 450 based on the character string Kanji 3 and the evaluation criterion for a person's name. The evaluation criterion is used to search for any suggestion relevant to the character string Kanji 3 (hereafter, a relevant suggestion). More specifically, the relevant suggestion refers to, for example, a suggestion with a high co-occurrence frequency, a suggestion in the same category, and a suggestion defined as relevant by the user. The relevant suggestion may also include a suggestion determined to be relevant through machine learning.

The dictionary searcher 403 outputs relevant suggestions Kanji 5 and Kanji 4 to the suggestion list generator 300 as a search result.

The suggestion list generator 300 outputs a list of relevant suggestions Kanji 5 and Kanji 4 to the suggestion management unit 200. The suggestion management unit 200 outputs the character string Kanji 3 and the relevant suggestions Kanji 5 and Kanji 4 to the controller 500.

As shown in FIG. 2B, the controller 500 generates the divisional-suggestion display area 802, and outputs the character string Kanji 3 and the relevant suggestions Kanji 5 and Kanji 4 to the divisional-suggestion display area 802. The character string Kanji 3 is deleted from the standard-suggestion display area 801.

The divisional-suggestion display area 802 may include a scrollbar when many relevant suggestions are available. This removes the limitation on the number of relevant suggestions output to the divisional-suggestion display area 802. Additionally, scrolling the scrollbar allows a quick selection from relevant suggestions.

A process performed by the character input device 10 for displaying the divisional-suggestion display area will now be described with reference to the flowchart in FIG. 3.

The user selects a character string from a list of suggestions appearing in the standard-suggestion display area 801, and moves the selected character string from the standard-suggestion display area 801. The operation detector 700 detects the movement of the character string (S101).

The suggestion division management unit 101 generates the divisional-suggestion display area 802 (S102).

The suggestion list management unit 400 searches for any relevant suggestion (S103).

The suggestion list management unit 400 determines whether any relevant suggestion is available (S104). When the suggestion list management unit 400 determines that no relevant suggestion is available (No in S104), the controller 500 displays the character string in the divisional-suggestion display area 802 (S105).

When the suggestion list management unit 400 determines that one or more relevant suggestions are available (Yes in S104), the relevant suggestion(s) are output in addition to the character string (S111). The controller 500 displays the character string and the relevant suggestion(s) in the divisional-suggestion display area 802 (S105).

Figure 4:
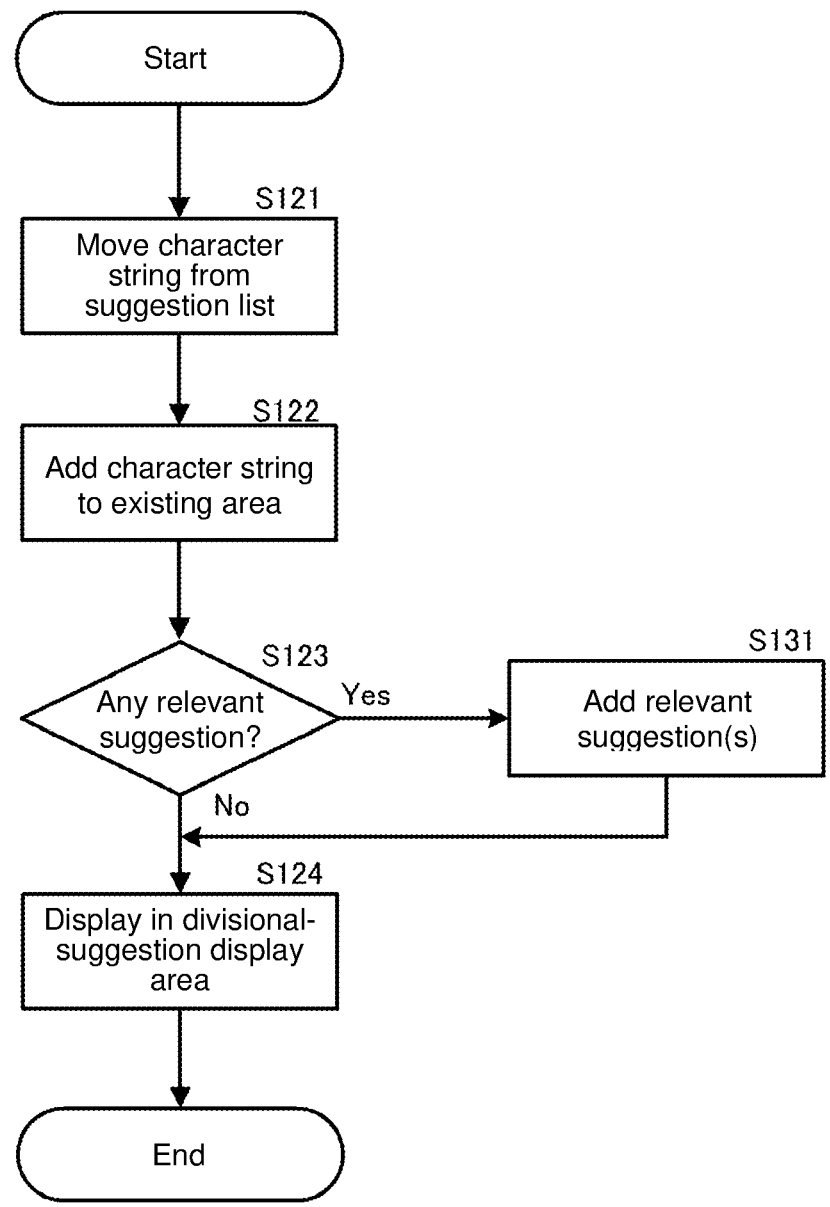
FIG. 4 is a flow diagram illustrating an operation of a character input device according to a first embodiment.

A process performed when any existing divisional-suggestion display area is already available will now be described with reference to the flowchart in FIG. 4.

The user selects a character string from a list of suggestions appearing in the standard-suggestion display area 801, and moves the selected character string from the standard-suggestion display area 801. The operation detector 700 detects the movement of the character string (S121).

The suggestion division management unit 101 adds the character string to an existing divisional-suggestion display area 802 (S122).

The suggestion list management unit 400 determines whether any relevant suggestion is available (S123). When the suggestion list management unit 400 determines that no relevant suggestion is available (No in S123), the controller 500 displays the character string in the divisional-suggestion display area 802 (S124).

When the suggestion list management unit 400 determines that one or more relevant suggestions are available (Yes in S123), the relevant suggestion(s) are output in addition to the character string (S131). The controller 500 displays the character string and the relevant suggestion(s) in the divisional-suggestion display area 802 (S124).

The above structure can divide the area for displaying conversion suggestions as intended by the user, and can also display any available suggestion relevant to the character string selected by the user. This enables highly usable character input.

The structure described above uses a single divisional-suggestion display area 802. However, multiple divisional-suggestion display areas 802 may be provided either in response to multiple evaluation criteria generated by the evaluation criterion generator 401 or by default. This enables more highly usable character input.

Example Structure 2

Figure 5:
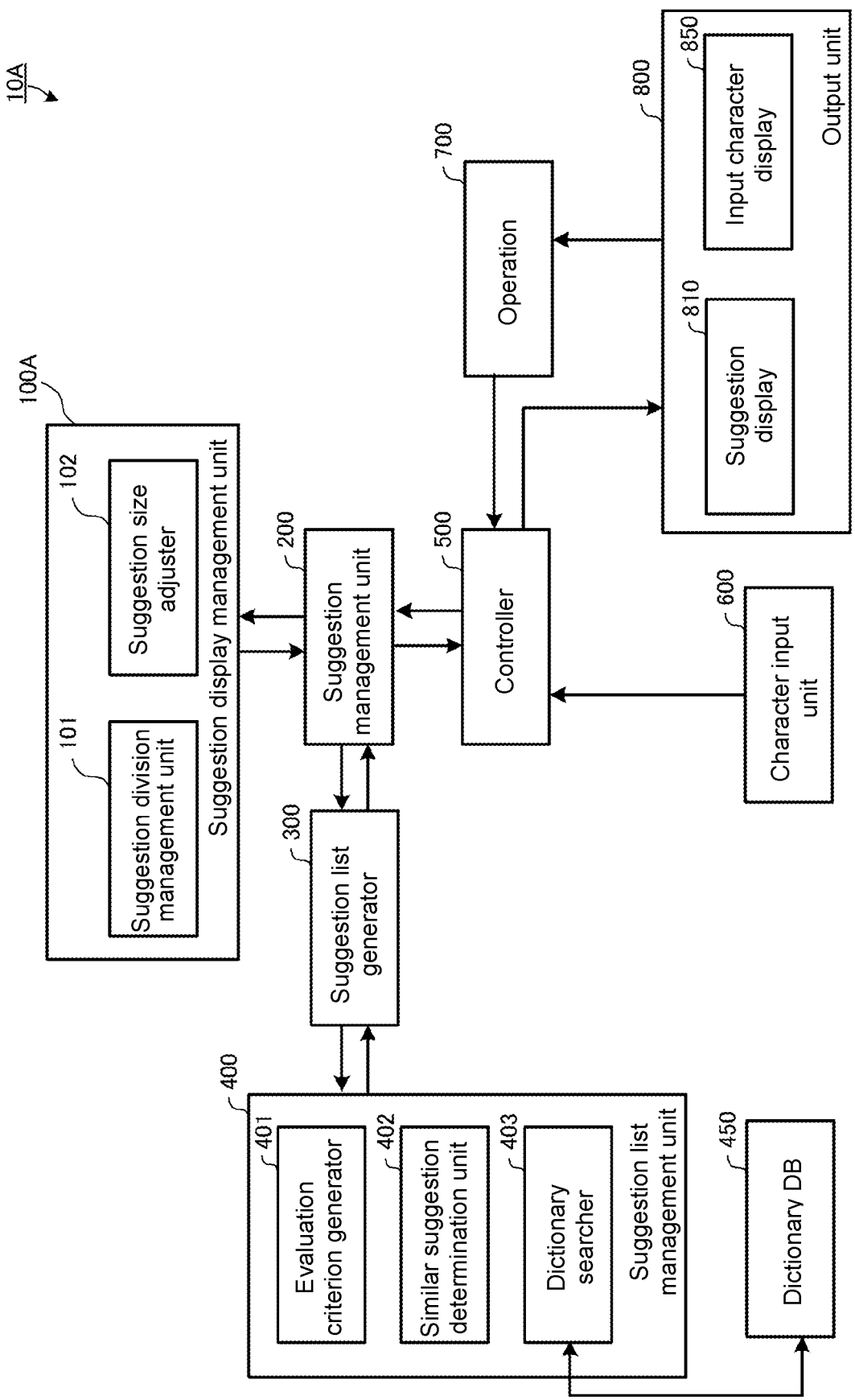
FIG. 5 is a block diagram illustrating a character input device according to a second embodiment.
Figure 6:
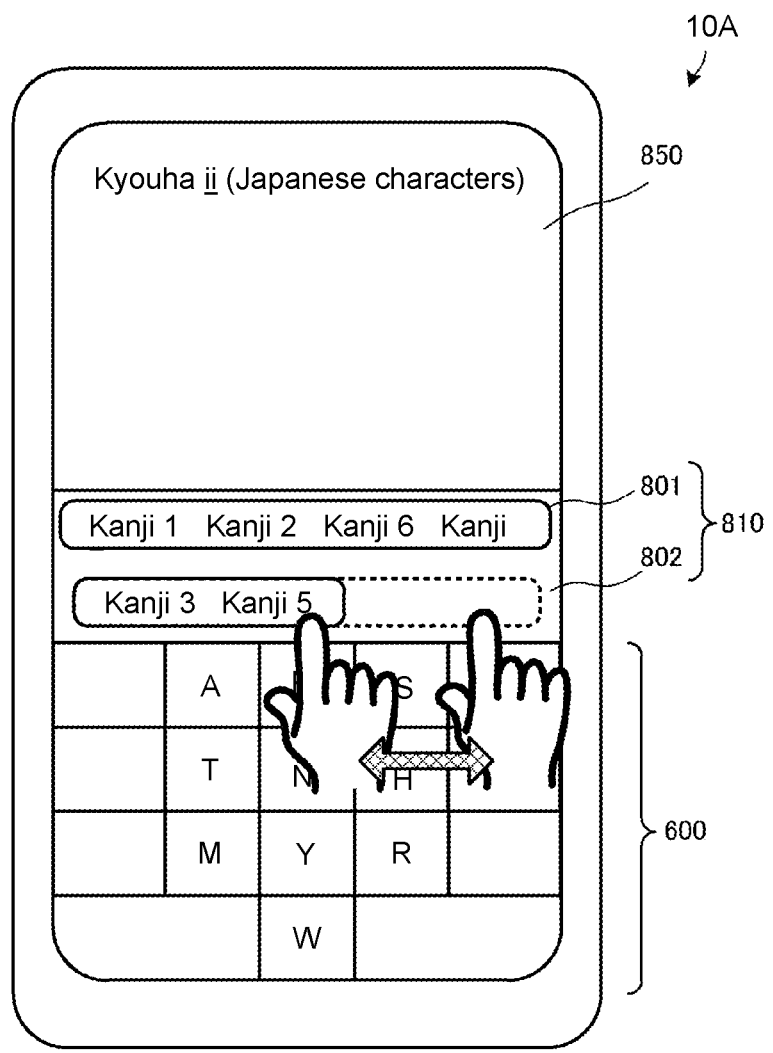
FIG. 6 is a schematic diagram illustrating a character input device according to a second embodiment.

An operation for adjusting a divisional-suggestion display area will now be described in detail with reference to FIGS. 5 and 6. FIG. 5 is a block diagram of a character input device 10A according to a second embodiment. FIG. 6 is a schematic diagram of the character input device 10A according to a second embodiment.

A second embodiment differs from a first embodiment in that a suggestion display management unit 100A includes a suggestion size adjuster 102. The other components and processes are the same as those in a first embodiment, and will not be described.

As shown in FIGS. 5 and 6, the user changes the display size of the divisional-suggestion display area 802. More specifically, the user selects and drags one end of the divisional-suggestion display area 802 to change the display size. The operation detector 700 detects the change in the display size (hereafter, a display size change) of the divisional-suggestion display area 802.

The operation detector 700 outputs information indicating the display size change to the controller 500. The controller 500 outputs the information indicating the display size change to the suggestion management unit 200.

The suggestion management unit 200 outputs the information indicating the display size change to the suggestion size adjuster 102. The suggestion size adjuster 102 determines whether the display size change is possible. When possible, the suggestion size adjuster 102 stores the display size.

The suggestion size adjuster 102 outputs, to the suggestion management unit 200, information indicating that the display size change is possible. The suggestion management unit 200 outputs, to the controller 500, the information indicating that the display size change is possible.

The controller 500 accepts the display size change of the divisional-suggestion display area 802.

A character input device 10A with this structure provides visual usability intended by the user.

When the suggestion size adjuster 102 determines that the display size change is impossible, a pop-up notification may appear to indicate that the change is impossible.

Example Structure 3

Figure 7:
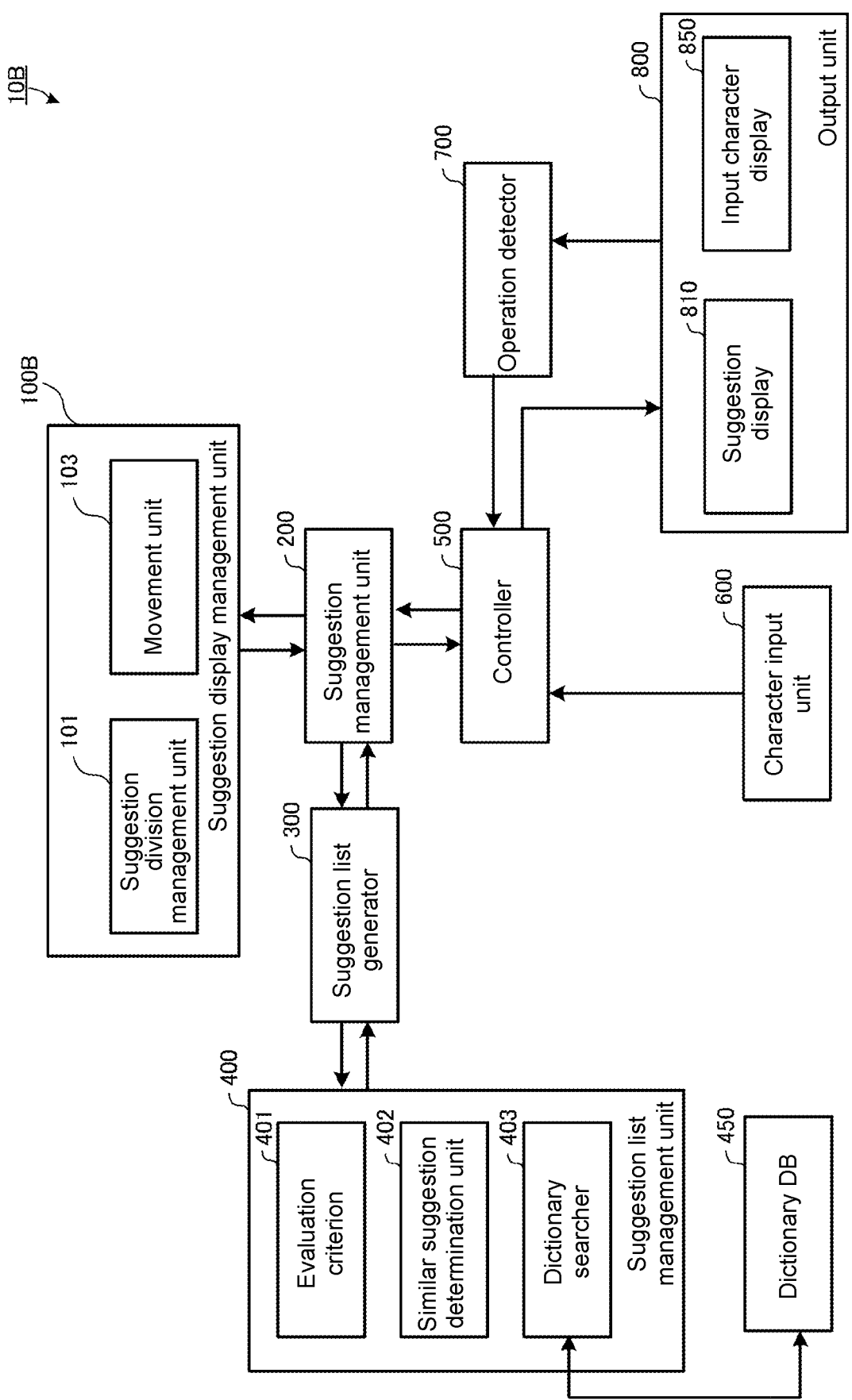
FIG. 7 is a block diagram illustrating a character input device according to a third embodiment.
Figure 8A:
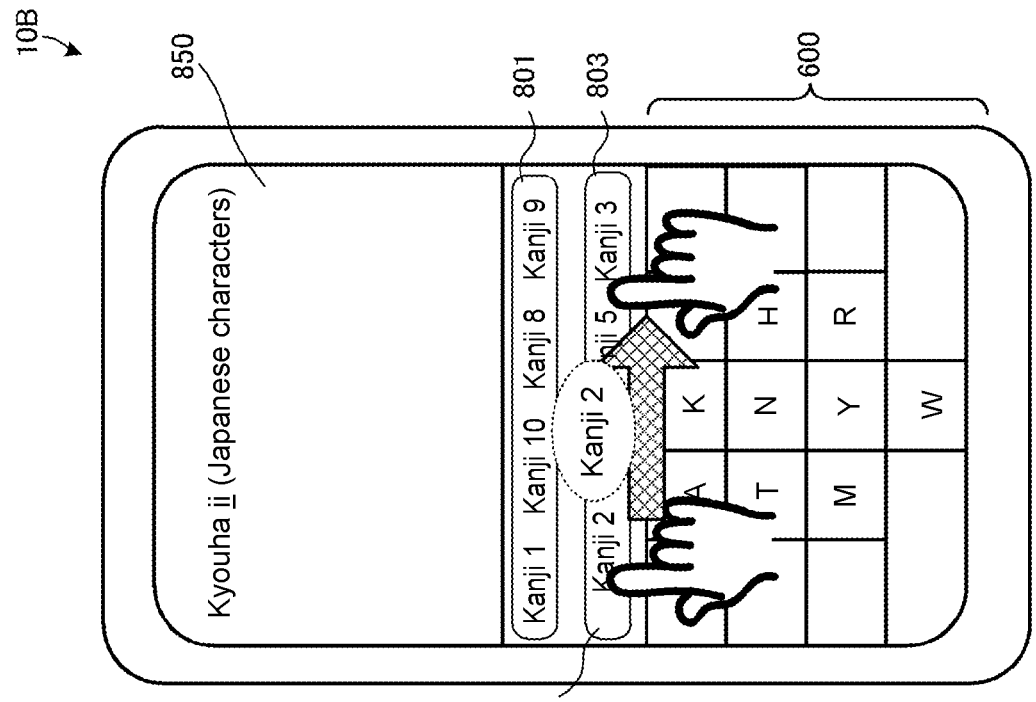
FIGS. 8A and 8B are schematic diagrams illustrating a character input device according to a third embodiment.
Figure 8B:
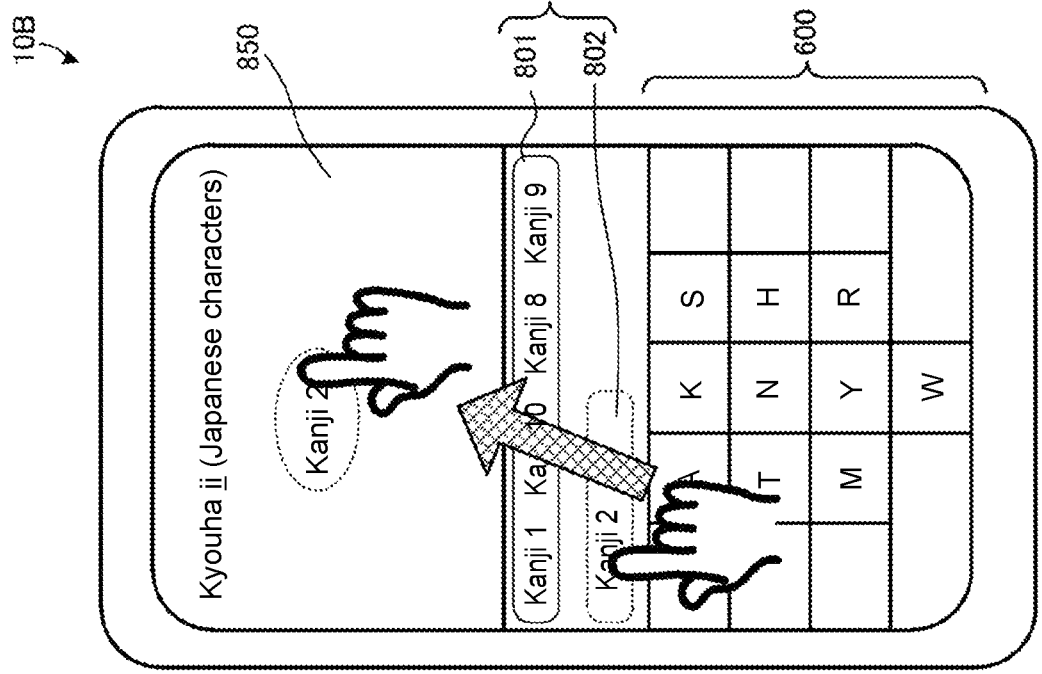
Figure 9:
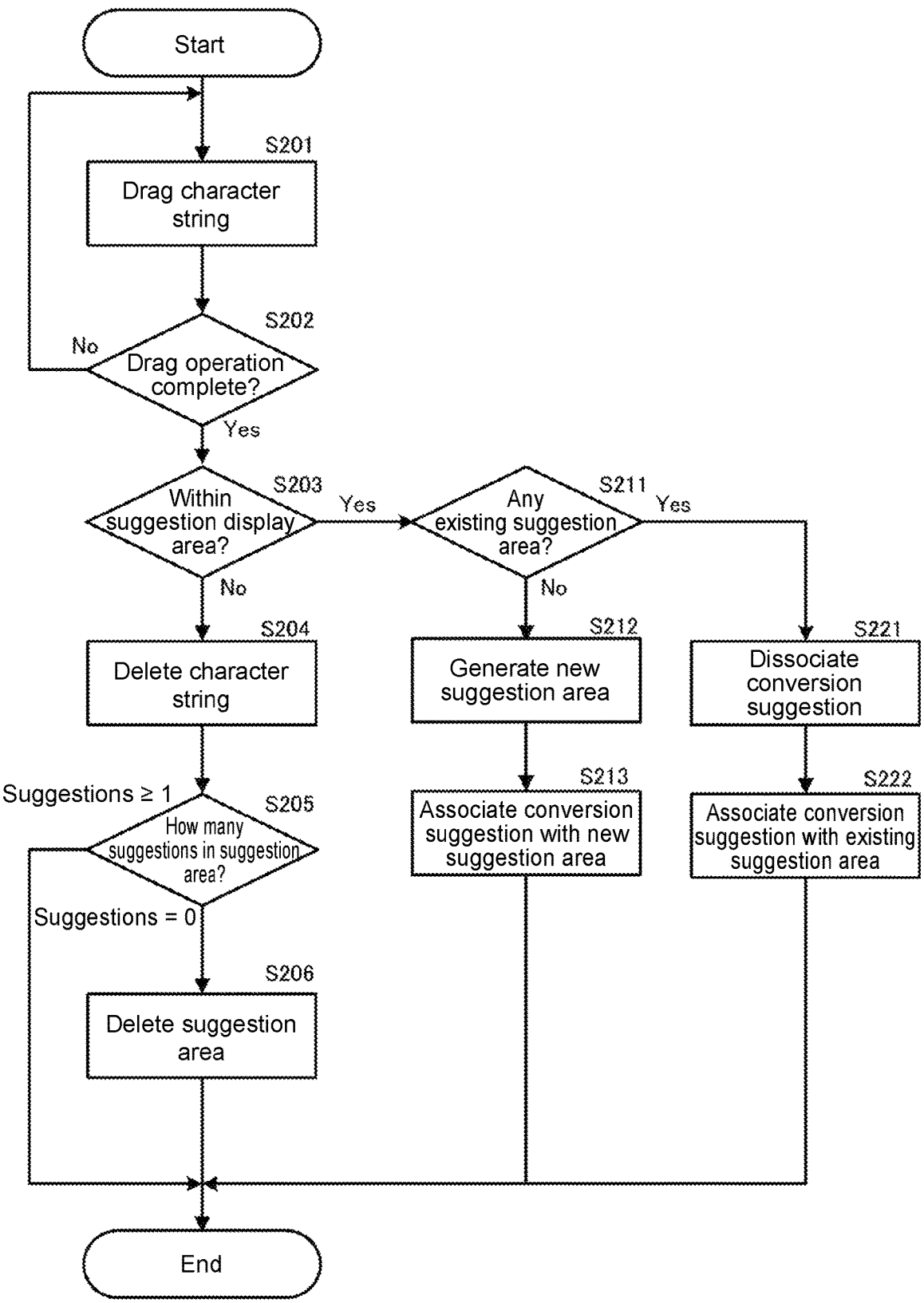
FIG. 9 is a flow diagram illustrating an operation of a character input device according to a third embodiment.

An operation for adjusting a divisional-suggestion display area will now be described in detail with reference to FIGS. 7 to 9. FIG. 7 is a block diagram of a character input device 10B according to a third embodiment. FIGS. 8A and 8B are schematic diagrams of the character input device 10B according to a third embodiment. FIG. 9 is a flowchart showing an operation of the character input device 10B according to a third embodiment.

A third embodiment differs from a first embodiment in that a suggestion display management unit 100B includes a movement unit 103. The other components and processes are the same as those in a first embodiment, and will not be described.

Referring to FIGS. 7 and 8A, deletion of the divisional-suggestion display area 802 will be described. The user selects the character string Kanji 2 appearing in the divisional-suggestion display area 802, and drags the character string out of the suggestion display 810. The operation detector 700 detects the movement of the character string Kanji 2.

The operation detector 700 outputs information indicating the movement of the character string Kanji 2 to the controller 500. The controller 500 outputs the information indicating the movement of the character string Kanji 2 to the suggestion management unit 200.

The suggestion management unit 200 outputs the information indicating the movement of the character string Kanji 2 to the movement unit 103. The movement unit 103 determines that the position of the character string Kanji 2 is outside the area of the suggestion display 810. The movement unit 103 outputs, to the suggestion division management unit 101, information indicating that the character string Kanji 2 is moved out of the area of the suggestion display 810. The suggestion division management unit 101 dissociates the character string Kanji 2 from the divisional-suggestion display area 802.

The suggestion division management unit 101 outputs an instruction for deleting the character string Kanji 2 to the suggestion management unit 200. The suggestion management unit 200 outputs the instruction for deleting the character string Kanji 2 to the controller 500. The controller 500 deletes the character string Kanji 2 from a divisional-suggestion display area 802.

The suggestion division management unit 101 determines whether any suggestion other than the character string Kanji 2 appears in the divisional-suggestion display area 802. When determining that no character string other than the character string Kanji 2 is registered, the suggestion division management unit 101 outputs, to the suggestion management unit 200, an instruction for deleting the character string Kanji 2 and the divisional-suggestion display area 802.

The suggestion management unit 200 outputs the instruction for deleting the divisional-suggestion display area 802 to the controller 500. The controller 500 deletes the divisional-suggestion display area 802 from the suggestion display 810.

Referring to FIGS. 7 and 8B, moving a character string from the divisional-suggestion display area 802 will now be described. The suggestion display 810 includes a divisional-suggestion display area 802 and a divisional-suggestion display area 803. In the example described below, a character string is moved from the divisional-suggestion display area 802 to the divisional-suggestion display area 803.

The user selects the character string Kanji 2 appearing in the divisional-suggestion display area 802, and drags the character string to the divisional-suggestion display area 803 from the divisional-suggestion display area 802. The operation detector 700 detects the movement of the character string Kanji 2.

The operation detector 700 outputs information indicating the movement of the character string Kanji 2 to the controller 500. The controller 500 outputs the information indicating the movement of the character string Kanji 2 to the suggestion management unit 200.

The suggestion management unit 200 outputs the information indicating the movement of the character string Kanji 2 to the movement unit 103. The movement unit 103 determines that the position of the character string Kanji 2 is changed from the divisional-suggestion display area 802 to the divisional-suggestion display area 803. The movement unit 103 outputs, to the suggestion division management unit 101, information indicating that the position of the character string Kanji 2 is changed from the divisional-suggestion display area 802 to the divisional-suggestion display area 803.

The suggestion division management unit 101 dissociates the character string Kanji 2 from the divisional-suggestion display area 802. The suggestion division management unit 101 associates the character string Kanji 2 with the divisional-suggestion display area 803.

The suggestion division management unit 101 outputs, to the suggestion management unit 200, an instruction for associating the character string Kanji 2 with the divisional-suggestion display area 803.

The suggestion management unit 200 outputs, to the controller 500, the instruction for associating the character string Kanji 2 with the divisional-suggestion display area 803. The controller 500 displays the character string Kanji 2 on the divisional-suggestion display area 803.

A character input device 10B with this structure provides usability intended by the user. When a character string is moved, any suggestion relevant to the moved character string may also be displayed.

A process for deleting a divisional-suggestion display area and moving a character string will now be described with reference to the flowchart in FIG. 9.

The user drags a character string (S201). The operation detector 700 determines whether the drag operation is complete (S202).

When the drag operation is incomplete (No in S202), the process returns to step S201.

When the drag operation is complete (Yes in S202), the operation detector 700 determines whether the dragged character string is moved within the area of the suggestion display 810 (S203).

When the operation detector 700 determines that the character string is outside the suggestion display 810 (No in S203), the controller 500 deletes the character string (S204).

The suggestion management unit 200 determines whether any other suggestion remains in the divisional-suggestion display area (S205). When the suggestion management unit 200 determines that no suggestion remains in the divisional-suggestion display area (suggestions=0 in S205), the divisional-suggestion display area is deleted (S206).

When the suggestion management unit 200 determines that one or more suggestions remain in the divisional-suggestion display area (one or more suggestions in S205), the process ends.

When the operation detector 700 determines that the dragged character string is within the area of the suggestion display 810 (Yes in S203), the suggestion division management unit 101 determines whether any existing divisional-suggestion display area is available (S211).

When determining that no existing divisional-suggestion display area is available (No in S211), the suggestion division management unit 101 generates a new divisional-suggestion display area (S212). The suggestion division management unit 101 associates the dragged character string with the new divisional-suggestion display area for display (S213).

When determining that an existing divisional-suggestion display area is available (Yes in S211), the suggestion division management unit 101 dissociates the dragged character string from the divisional-suggestion display area from which the character string is dragged (S221). The suggestion division management unit 101 associates the dragged character string with the existing divisional-suggestion display area for display (S222).

Example Structure 4

Figure 10:
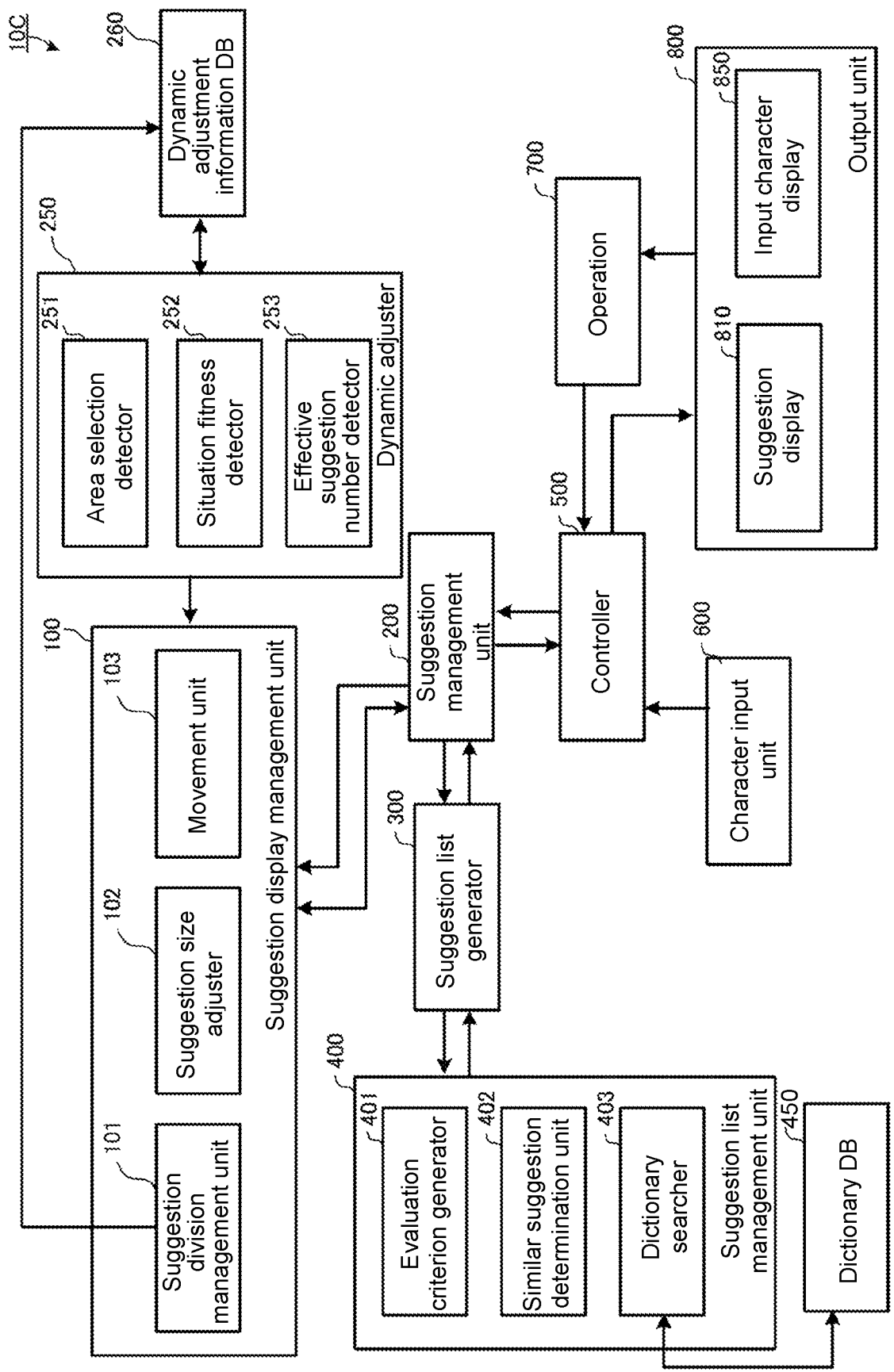
FIG. 10 is a block diagram illustrating a character input device according to a fourth embodiment.
Figure 11:
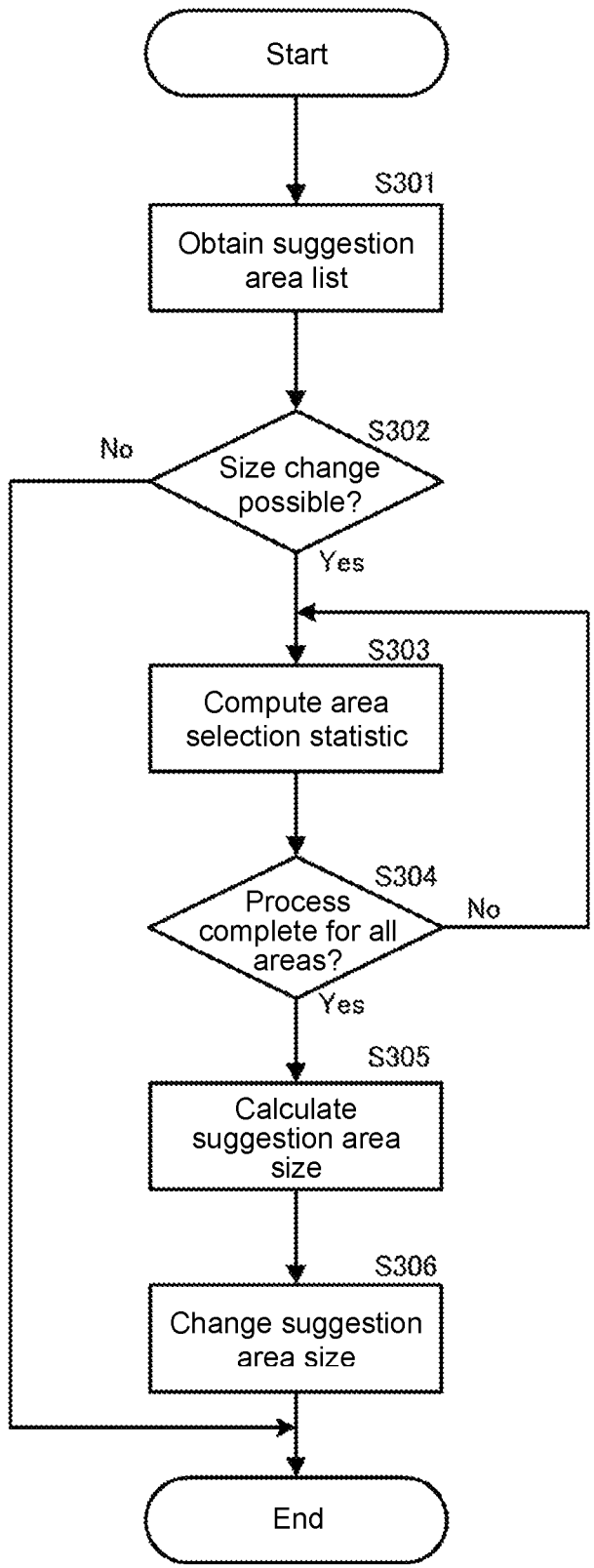
FIG. 11 is a flow diagram illustrating an operation of a character input device according to a fourth embodiment.
Figure 12:
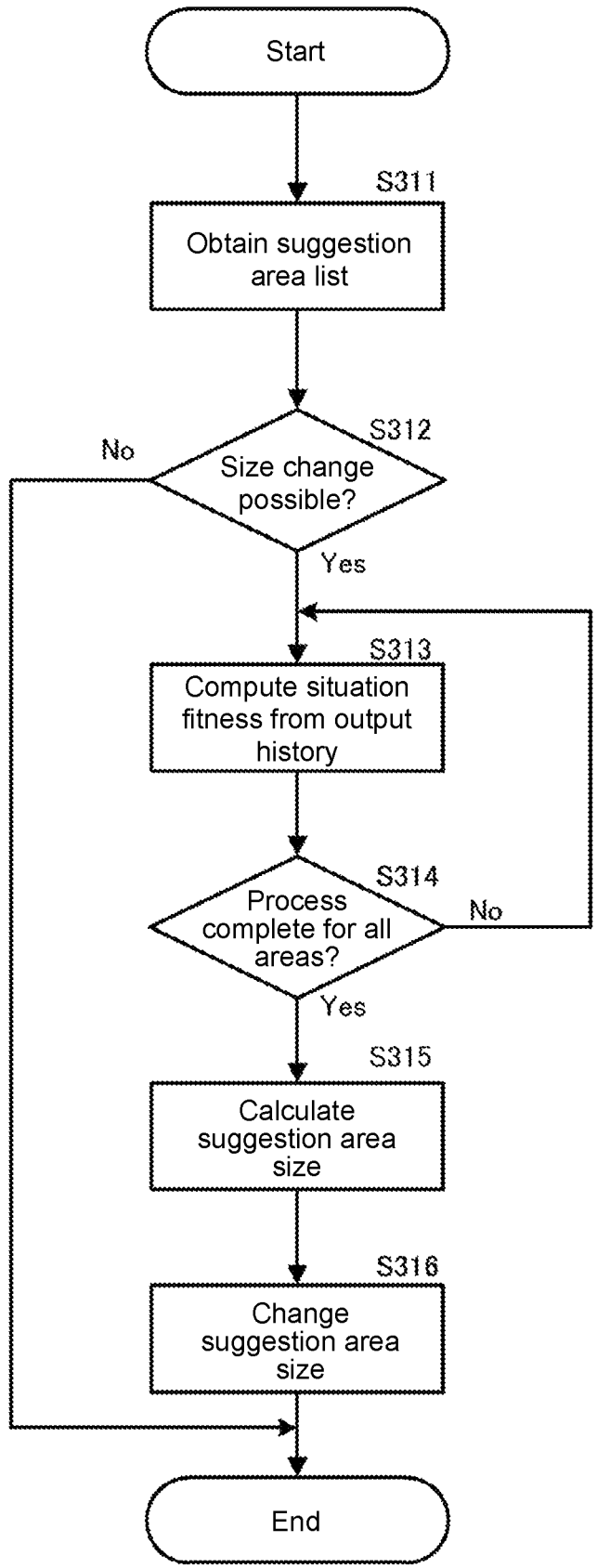
FIG. 12 is a flow diagram illustrating an operation of a character input device according to a fourth embodiment.
Figure 13:
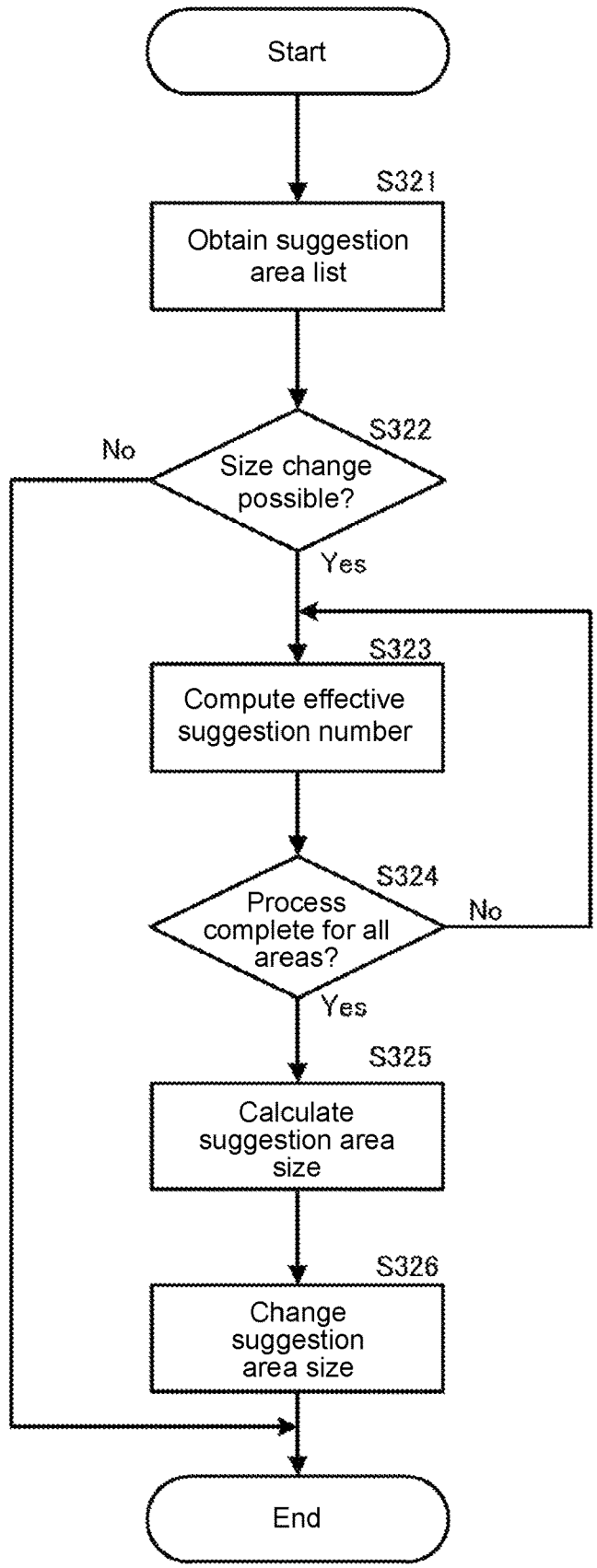
FIG. 13 is a flow diagram illustrating an operation of a character input device according to a fourth embodiment.

An operation for adjusting a divisional-suggestion display area will now be described in detail with reference to FIGS. 10 to 13. FIG. 10 is a block diagram of a character input device 10C according to a fourth embodiment. FIG. 11 is a flowchart showing an operation of the character input device 10C according to a fourth embodiment. FIG. 12 is a flowchart showing an operation of the character input device 10C according to a fourth embodiment. FIG. 13 is a flowchart showing an operation of the character input device 10C according to a fourth embodiment.

A fourth embodiment differs from the combination of the first, second, and third embodiments in including a dynamic adjuster and a dynamic adjustment information DB. The other components and processes are the same as those in the first, second, and third embodiments, and will not be described.

As shown in FIG. 10, a dynamic adjuster 250 includes an area selection detector 251, a situation fitness detector 252, and an effective suggestion number detector 253. The area selection detector 251 statistically determines the number of times a divisional-suggestion display area has been selected (selection count) by the user. The situation fitness detector 252 statistically determines the number of times a conversion suggestion has been selected (selection count) by the user from, for example, context. The effective suggestion number detector 253 statistically determines the number of suggestions relevant to a conversion suggestion or the number of relevant suggestions having a high degree of relevance (hereafter, the number of effective suggestions) appearing in a divisional-suggestion display area.

The area selection detector 251, the situation fitness detector 252, and the effective suggestion number detector 253 store their determination results into a dynamic adjustment information DB 260.

The dynamic adjuster 250 dynamically determines the size of a divisional-suggestion display area using the determination results obtained with the area selection detector 251, the situation fitness detector 252, and the effective suggestion number detector 253. A process performed with the area selection detector 251, the situation fitness detector 252, or the effective suggestion number detector 253 will now be described in detail.

Structure for Detecting Statistic of Area Selection Count

A method used by the area selection detector 251 for adjusting the size of a divisional-suggestion display area will now be described with reference to FIGS. 10 and 11. The suggestion division management unit 101 included in the suggestion display management unit 100 stores the selection count for a divisional-suggestion display into the dynamic adjustment information DB 260. This allows storage of statistical results about the selection of a divisional-suggestion display area.

The controller 500 obtains a list of divisional-suggestion display areas from the suggestion display 810 (S301).

The controller 500 outputs the list of divisional-suggestion display areas to the suggestion management unit 200. The suggestion management unit 200 outputs the list of divisional-suggestion display areas to the suggestion division management unit 101. The suggestion division management unit 101 retrieves the number of divisional-suggestion display areas and the size of each divisional-suggestion display area, and determines whether a size change is possible (S302).

When determining that the size change is possible for the divisional-suggestion display areas (Yes in S302), the suggestion division management unit 101 outputs, to the area selection detector 251, information indicating that the size change is possible.

The area selection detector 251 refers to the dynamic adjustment information DB 260 and computes a statistic of the selection count for each area (S303).

The area selection detector 251 determines whether the determination about the area selection is complete for all the divisional-suggestion display areas included in the suggestion display 810 (S304).

When determining that the area selection determination is complete for all the divisional-suggestion display areas included in the suggestion display 810 (Yes in S304), the area selection detector 251 outputs the determination result to the suggestion size adjuster 102. The suggestion size adjuster 102 calculates the size of each divisional-suggestion display area from the determination result (S305).

The suggestion size adjuster 102 outputs the size of each divisional-suggestion display area to the suggestion management unit 200. The suggestion management unit 200 outputs the size of each divisional-suggestion display area to the controller 500. The controller 500 changes the size of each divisional-suggestion display area appearing on the suggestion display 810 (S306).

In step S302, when the suggestion division management unit 101 determines that the size change is impossible for the divisional-suggestion display areas (No in S302), the process ends.

In step S304, when the area selection detector 251 determines that area selection determination is incomplete for any of the divisional-suggestion display areas included in the suggestion display 810 (No in S304), the process returns to step S303.

The above structure can determine the size of a divisional-suggestion display area in accordance with the count for the divisional-suggestion display area selected by the user. More specifically, a character input device 10C with this structure reflects the use situation of the user.

Structure Using Statistic of Conversion Suggestion Selection Count

A method used by the situation fitness detector 252 for adjusting the size of a divisional-suggestion display area will now be described with reference to FIGS. 10 and 12. The suggestion division management unit 101 included in the suggestion display management unit 100 stores the selection count for a conversion suggestion into the dynamic adjustment information DB 260. This allows storage of statistical results about the count for a conversion suggestion selection in a divisional-suggestion display area.

The controller 500 obtains a list of divisional-suggestion display areas from the suggestion display 810 (S311).

The controller 500 outputs the list of divisional-suggestion display areas to the suggestion management unit 200. The suggestion management unit 200 outputs the list of divisional-suggestion display areas to the suggestion division management unit 101. The suggestion division management unit 101 retrieves the number of divisional-suggestion display areas and the size of each divisional-suggestion display area, and determines whether a size change is possible (S312).

When determining that the size change is possible for the divisional-suggestion display areas (Yes in S312), the suggestion division management unit 101 outputs, to the situation fitness detector 252, information indicating that the size change is possible.

The situation fitness detector 252 refers to the dynamic adjustment information DB 260 and computes a statistic of situation fitness based on the output history, or specifically based on the selection count for the conversion suggestion (S313).

The situation fitness detector 252 determines whether the determination about the situation fitness is complete for all the divisional-suggestion display areas included in the suggestion display 810 (S314).

When determining that the determination about the situation fitness is complete for all the divisional-suggestion display areas included in the suggestion display 810 (Yes in S314), the situation fitness detector 252 outputs the determination result to the suggestion size adjuster 102. The suggestion size adjuster 102 calculates the size of each divisional-suggestion display area from the determination result (S315).

The suggestion size adjuster 102 outputs the size of each divisional-suggestion display area to the suggestion management unit 200. The suggestion management unit 200 outputs the size of each divisional-suggestion display area to the controller 500. The controller 500 changes the size of each divisional-suggestion display area appearing on the suggestion display 810 (S316).

In step S312, when the suggestion division management unit 101 determines that the size change is impossible for the divisional-suggestion display areas (No in S312), the process ends.

In step S314, when the situation fitness detector 252 determines that the determination about the situation fitness is incomplete for any of the divisional-suggestion display areas included in the suggestion display 810 (No in S314), the process returns to step S313.

The above structure can determine the size of a divisional-suggestion display area in accordance with the count for the conversion suggestion selected by the user. More specifically, a character input device 10C with this structure reflects the use situation of the user.

Structure Using Statistic of Effective Suggestion Number

A method used by the effective suggestion number detector 253 for adjusting the size of a divisional-suggestion display area will now be described with reference to FIGS. 10 and 13. The suggestion division management unit 101 included in the suggestion display management unit 100 stores the number of effective suggestions into the dynamic adjustment information DB 260. This statistically stores the number of effective suggestions in a divisional-suggestion display area.

The controller 500 obtains a list of divisional-suggestion display areas included in the suggestion display 810 (S321).

The controller 500 outputs the list of divisional-suggestion display areas to the suggestion management unit 200. The suggestion management unit 200 outputs the list of divisional-suggestion display areas to the suggestion division management unit 101. The suggestion division management unit 101 retrieves the number of divisional-suggestion display areas and the size of each divisional-suggestion display area, and determines whether a size change is possible (S322).

When determining that the size change is possible for the divisional-suggestion display areas (Yes in S322), the suggestion division management unit 101 outputs, to the effective suggestion number detector 253, information indicating that the size change is possible.

The effective suggestion number detector 253 refers to the dynamic adjustment information DB 260 and computes a statistic of the number of effective suggestions (S323).

The effective suggestion number detector 253 determines whether the determination about the number of effective suggestions is complete for all the divisional-suggestion display areas included in the suggestion display 810 (S324).

When determining that the determination about the number of effective suggestions is complete for all the divisional-suggestion display areas included in the suggestion display 810 (Yes in S324), the effective suggestion number detector 253 outputs the determination result to the suggestion size adjuster 102. The suggestion size adjuster 102 calculates the size of each divisional-suggestion display area from the determination result (S325).

The suggestion size adjuster 102 outputs the size of each divisional-suggestion display area to the suggestion management unit 200. The suggestion management unit 200 outputs the size of each divisional-suggestion display area to the controller 500. The controller 500 changes the size of each divisional-suggestion display area appearing on the suggestion display 810 (S326).

In step S322, when the suggestion division management unit 101 determines that the size change is impossible for the divisional-suggestion display areas (No in S322), the process ends.

In step S324, when the effective suggestion number detector 253 determines that the determination about the number of effective suggestions is incomplete for any of the divisional-suggestion display areas included in the suggestion display 810 (No in S324), the process returns to step S323.

The above structure can determine the size of a divisional-suggestion display area in accordance with the number of effective suggestions. More specifically, a character input device 10C with this structure reflects the use situation of the user.

Although the structure described above performs the processes shown in FIGS. 11 to 13 separately, the structure may perform these determinations in a single process. In this case, the character input device 10C both performs conversion and displays conversion suggestions in a manner more precisely reflecting the use situation of the user. The structure may perform two or more of the processes in combination, instead of performing the processes in FIGS. 11 to 13 altogether.

Although the size of the divisional-suggestion display area refers to the width in the example structure described above, the size may be changed in the height direction of the suggestion display 810.

Structures in embodiments may be expressed in the appendix below.

APPENDIX

A character input device (10), comprising:

a character input unit (600) configured to receive an input character;

a suggestion list management unit (400) configured to convert the input character;

a suggestion list generator (300) configured to generate a conversion suggestion list through conversion of the input character;

a suggestion display (810) including a standard-suggestion display area for displaying the conversion suggestion list;

an operation detector (700) configured to detect movement of a divisional suggestion included in the conversion suggestion list; and a suggestion division management unit (101) configured to generate a divisional-suggestion display area (802) different from the standard-suggestion display area in the suggestion display (810) in response to the movement of the divisional suggestion, wherein the suggestion division management unit (101) associates the divisional suggestion with the divisional-suggestion display area (802), and outputs the divisional suggestion to the divisional-suggestion display area (802).

REFERENCE SIGNS LIST

10, 10A, 10B, 10C character input device
100, 100A, 100B suggestion display management unit
101 suggestion division management unit
102 suggestion size adjuster
103 movement unit
200 suggestion management unit
250 dynamic adjuster
251 area selection detector
252 situation fitness detector
253 effective suggestion number detector
260 dynamic adjustment information DB
300 suggestion list generator
400 suggestion list management unit
401 evaluation criterion generator
402 similar suggestion determination unit
450 dictionary DB
500 controller
600 character input unit 700 operation detector
800 output unit
801 standard-suggestion display area
802, 803 divisional-suggestion display area
810 suggestion display
850 input character display

The invention claimed is:

1. A character input device, comprising a processor configured with a program to perform operations comprising:
   operation as a character input unit configured to receive an input character;
   operation as a suggestion list management unit configured to search for conversion suggestions for the input character;
   operation as a suggestion list generator configured to receive the conversion suggestions from the suggestion list management unit and generate a conversion suggestion list for the input character;
   displaying the conversion suggestion list on a suggestion display comprising a standard-suggestion display area, the conversion suggestion list displayed in the standard-suggestion display area;
   operation as an operation detector configured to detect movement of a divisional suggestion, included in the conversion suggestion list, out of the standard suggestion display area; and
   operation as a suggestion division management unit configured to: generate, in the suggestion display, a divisional-suggestion display area, different from the standard-suggestion display area, in response to the movement of the divisional suggestion; associate the divisional suggestion with the divisional-suggestion display area; and output the divisional suggestion to the divisional-suggestion display area.

2. The character input device according to claim 1, wherein the processor is configured with the program such that operation as the suggestion list management unit comprises, in response to a suggestion relevant to the divisional suggestion being available, outputting the relevant suggestion to the divisional-suggestion display area.

3. The character input device according to claim 1, wherein the processor is configured with the program such that operation as the suggestion division management unit comprises, in response to the operation detector detecting the divisional suggestion being moved from the divisional-suggestion display area, dissociating the divisional suggestion from the divisional-suggestion display area.

4. The character input device according to claim 1, wherein the processor is configured with the program to perform operations further comprising:
   operation as a suggestion size adjuster configured to adjust a size of the divisional-suggestion display area.

5. The character input device according to claim 4, wherein the processor is configured with the program to perform operations further comprising:
   operation as an area selection detector configured to count a number of times the divisional-suggestion display area is selected, wherein
   operation as the suggestion size adjuster comprises adjusting the size of the divisional-suggestion display area in accordance with the counted number of times.

6. The character input device according to claim 4, wherein the processor is configured with the program to perform operations further comprising:
   operation as an effective suggestion number detector configured to compute a number of effective suggestions based on a suggestion relevant to the input character and a degree of relevance of the suggestion to the input character, wherein
   operation as the suggestion size adjuster comprises adjusting the size of the divisional-suggestion display area in accordance with the number of effective suggestions.

7. A character input method implementable by a computer, the method comprising:
   receiving an input character;
   searching for conversion suggestions for the input character;
   generating, based on the conversion suggestions, a conversion suggestion list for the input character;
   displaying the conversion suggestion list in a standard-suggestion display area;
   detecting movement of a divisional suggestion included in the conversion suggestion list out of the standard display area;
   generating a divisional-suggestion display area, different from the standard-suggestion display area, and associating the divisional suggestion with the divisional-suggestion display area; and
   outputting the divisional suggestion to the divisional-suggestion display area.

8. A non-transitory computer-readable storage medium storing a character input program, which when read and executed, causes a computer to perform operations comprising:
   receiving an input character;
   searching for conversion suggestions for the input character;
   generating, based on the conversion suggestions, a conversion suggestion list for the input character;
   displaying the conversion suggestion list in a standard-suggestion display area;
   detecting movement of a divisional suggestion included in the conversion suggestion list out of the standard display area;
   generating a divisional-suggestion display area different from the standard-suggestion display area and associating the divisional suggestion with the divisional-suggestion display area; and
   outputting the divisional suggestion to the divisional-suggestion display area.

9. The method according to claim 7, further comprising, in response to a suggestion relevant to the divisional-suggestion being available, outputting the relevant suggestion to the divisional-suggestion display area.

10. The method according to claim 7, further comprising, in response to detecting the divisional suggestion being moved from the divisional-suggestion display area, dissociating the divisional suggestion from the divisional-suggestion display area.

11. The method according to claim 7, further comprising adjusting a size of the divisional-suggestion display area.

12. The method according to claim 11, further comprising:
   counting a number of times the divisional-suggestion display area is selected; and
   adjusting the size of the divisional-suggestion display area in accordance with the counted number of times.

13. The method according to claim 11, further comprising:
   computing a number of effective suggestions based on a suggestion relevant to the input character and a degree of relevance to the suggestion to the input character; and adjusting the size of the divisional-suggestion display area in accordance with the number of effective suggestions.

* * * * *